(12) United States Patent  
Book

(10) Patent No.: US 8,914,301 B2
(45) Date of Patent: Dec. 16, 2014

(54) METHOD AND APPARATUS FOR DYNAMIC AD CREATION

(76) Inventor: Joyce A. Book, San Francisco, CA (US)

( * ) Notice: Subject to any disclaimer, the term of this patent is extended or adjusted under 35 U.S.C. 154(b) by 1616 days.

(21) Appl. No.: 11/262,322

(22) Filed: Oct. 28, 2005

(65) Prior Publication Data

US 2007/0100688 A1    May 3, 2007

(51) Int. Cl.
*G06Q 30/00* (2012.01)
*G06Q 30/02* (2012.01)

(52) U.S. Cl.
CPC ............ *G06Q 30/02* (2013.01); *G06Q 30/0254* (2013.01); *G06Q 30/0271* (2013.01)
USPC ...................................... 705/14.64

(58) Field of Classification Search
USPC ........................................................ 705/14
See application file for complete search history.

(56) References Cited

U.S. PATENT DOCUMENTS

| | | | |
|---|---|---|---|
| 5,014,125 A | 5/1991 | Pocock et al. | |
| 5,991,799 A | 11/1999 | Yen et al. | |
| 6,605,120 B1 | 8/2003 | Fields et al. | |
| 6,807,558 B1 | 10/2004 | Hassett et al. | |
| 2002/0199188 A1 | 12/2002 | Sie et al. | |
| 2003/0018521 A1 | 1/2003 | Kraft et al. | |
| 2003/0028451 A1 | 2/2003 | Ananian | |
| 2003/0101454 A1 | 5/2003 | Ozer et al. | |
| 2003/0145323 A1 | 7/2003 | Hendricks et al. | |
| 2003/0154126 A1 | 8/2003 | Gehlot et al. | |
| 2003/0191816 A1 | 10/2003 | Landress et al. | |
| 2004/0010566 A1 | 1/2004 | Monteverde | |
| 2004/0059708 A1 | 3/2004 | Dean et al. | |
| 2004/0122811 A1 | 6/2004 | Page | |
| 2004/0189699 A1 | 9/2004 | Dobronsky | |
| 2004/0226051 A1 | 11/2004 | Carney et al. | |
| 2005/0144073 A1 | 6/2005 | Morrisroe et al. | |
| 2005/0165643 A1 | 7/2005 | Wilson et al. | |
| 2007/0162328 A1* | 7/2007 | Reich ............................... 705/14 |

* cited by examiner

*Primary Examiner* — Colleen Hoar
(74) *Attorney, Agent, or Firm* — Pillsbury Winthrop Shaw Pittman LLP

(57) ABSTRACT

The present invention provides methods and apparatus for selecting relating to content selection. In one aspect, the invention provides methods and apparatus for determining appropriate content based upon various other input data, particularly for individuals on whom personal data is already known. In another aspect of the invention provides method and apparatus for analyzing feedback statistics obtained from previously delivered content in order to update new content for delivery. Another aspect of the invention is combinations of content determination with the analysis of feedback statistics, preferably in real-time, to take into account not only individual preferences, but environmental and other factors. An embodiment of the present invention is directed toward personalized advertisements, with particularly preferred embodiments described that are implemented with an Internet media platform, an interactive digital television platform, as well as cross-platform implementations.

42 Claims, 11 Drawing Sheets

FURTHER DETAILED ANALYSIS
SELECTION CRITERIA TABLE

- WEATHER

- AGE

- TIME OF DAY

- DATE

- TRAFFIC

- MAJOR EVENT

- GPS

- IP ADDRESS

- PERSONAL EVENTS

- EDUCATION LEVEL

- PAST ITEM PURCHASES

- FOREIGN LANGUAGES

FIG. 8

METHOD AND APPARATUS FOR DYNAMIC AD CREATION

FIELD OF THE INVENTION

The present invention relates to a method and apparatus for dynamic ad creation, and, more particularly, a dynamic ad creation process that can be used with various different media platforms.

BACKGROUND OF THE INVENTION

For decades, standard ad campaigns have used demographic information—primarily zip code, gender and income,—in order to create advertisements directed to groups of people. An advantage of using this demographic information has been that certain feedback statistics, though imprecise, can be obtained in order to determine if the content of the ad is properly targeting the intended group of recipients. A problem, however, still exists in that such feedback statistics are very imprecise and also not timely obtained, analyzed and able to be used to make decisions.

Reports on the manner in which certain groups respond to an ad campaign also exist, but such reports tend to rely on assumptions relating to behavior, rather than identifiable statistics.

With the proliferation of the Internet and interactive television, advertisements have continued to play a significant role, with the added aspect of monitoring behavior in order to determine which ad to use—such keying ads to keywords, and having paid advertisements associated with such ads. But while technology continues to evolve, the manner in which advertisements are created and used has remained quite conventional. Thus, while banner ads exist that can relate to the subject matter of a web-page, and interactive television ads are played on a part of the screen relating to product that is part of a television broadcast, such advertisements are essentially flat or static, in that the same advertisement is used for each of the different viewers.

There are instances in which advertisements have been directed to the location of a person, such that a local restaurant ad is displayed based upon the user's location. In such advertisements, however, the advertisement is still "flat" and remains the same.

What is needed, therefore, are methods and systems in which an advertisement is personalized, and created taking into account different levels of user information. Furthermore, it would be advantageous for such methods and systems to have uses that are beyond the realm of traditional advertising, and can be used to implement a variety of functionalities.

SUMMARY OF THE INVENTION

The present invention provides methods and apparatus for content selection, as well as methods and apparatus for analysis and use of feedback statistics obtained from previously delivered content, so that not only the content delivered is accurate, but that the content is delivered with the appropriate context.

On one aspect, the invention provides methods and apparatus for determining appropriate content based upon various other input data, particularly for individuals on whom personal data is already known.

In another aspect of the invention provides method and apparatus for analyzing feedback statistics obtained from previously delivered content in order to update new content for delivery.

Another aspect of the invention is combinations of content determination with the analysis of feedback statistics, preferably in real-time, to take into account not only individual preferences, but environmental and other factors.

An embodiment of the present invention is directed toward personalized advertisements, with particularly preferred embodiments described that are implemented with an Internet media platform, an interactive digital television platform, as well as cross-platform implementations.

Other aspects of the present invention will become more apparent from the following detailed description.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIG. 8 illustrates a table of further detailed selection criteria according to a preferred embodiment of the present invention;

DETAILED DESCRIPTION OF THE PREFERRED EMBODIMENT

Figure 1:
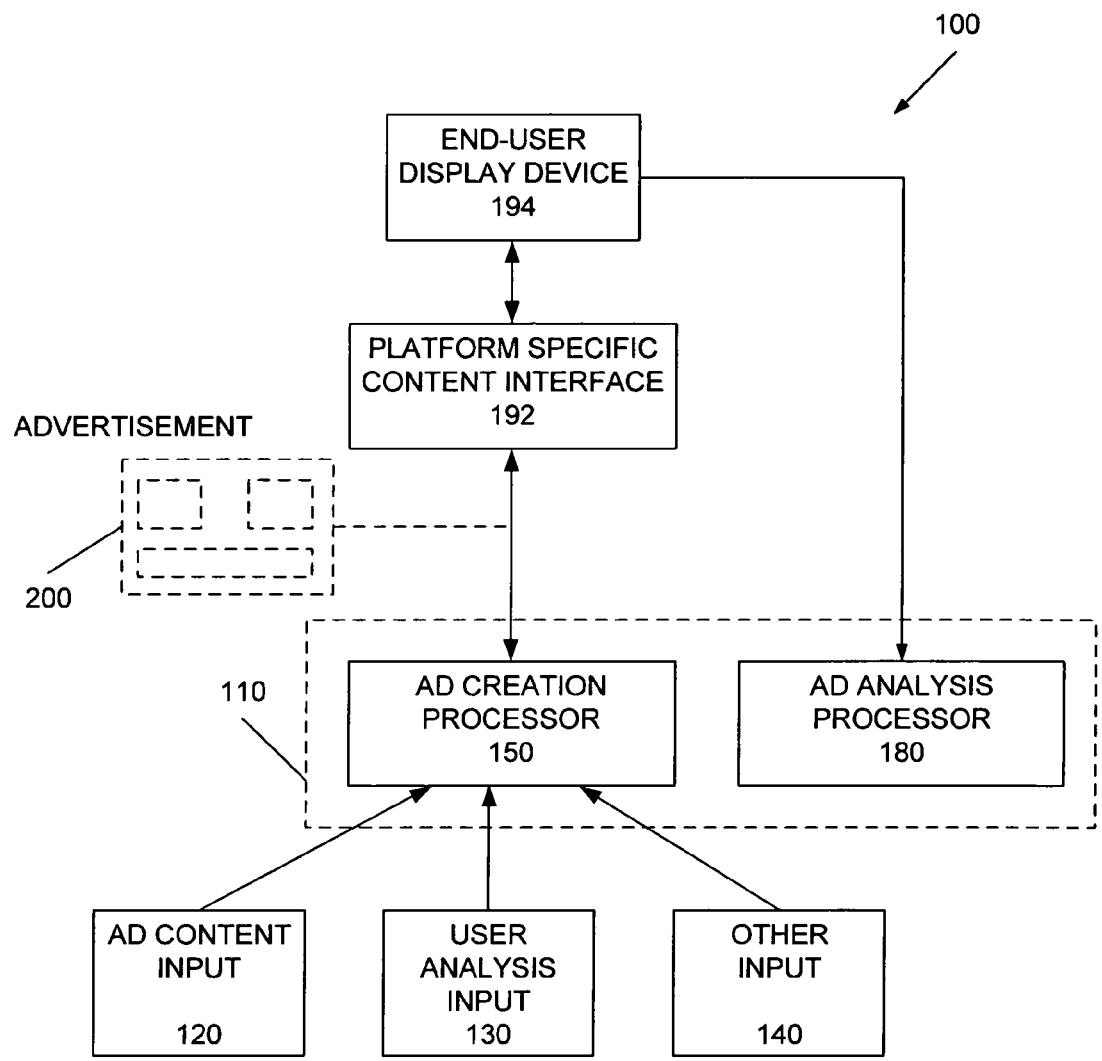
FIG. 1 illustrates a block diagram of the dynamic ad creation system according to a preferred embodiment of the present invention.

FIG. 1 illustrates a block diagram of the dynamic content creation system 100 according to a preferred embodiment of the present invention. As will be described in more detail below, the system 100 has the ability to provide content in the appropriate context, using obtained user information and other information to determine what content to send to a particular individual, without that individual themselves needing to directly provide inputs to the system. So, for example, in Internet advertising, the system automates the creation and usage of various sections—landing pages, copy, images—even sections of the advertisement itself—and optimizes the advertisement, preferably in substantially real time, and then analyzes statistical feedback that can be used to alter subsequently generated advertisements, as well as further store information the particular user from whom the feedback was received, for usage in the same or other advertising campaigns at a subsequent time.

While the presently preferred implementation of the present invention is directed to dynamic ad creation, it is noted that the system 100 and method associated therewith can be applied to other forms of content, including but not limited to the creation of news (with one example being whether an individual prefers sports (further distinguished by type of sports and location), current local events, current world events, fashion, entertainment, and business for example), educational materials, and programming that provides different content selections (such as audio selections, movies, sitcoms, books, magazines or educational materials) for different receivers of the same. In each of the these implementations, various portions of content can be identified and stored, and then subsequently retrieved for a particular user based upon the rules that have been established. Certain aspects of the present invention that implement these capabilities will be described with particular reference to an Internet ad campaign, but it will be appreciated that cross-platform ad campaigns, other types of non-Internet ad campaigns (such as catalogs that are created with content directed almost exclusively to products that a particular individual has a history of purchasing), as well as other forms of non-ad content as discussed immediately above can be operated upon similarly as described herein.

As illustrated in FIG. 1, the system 100 includes an ad (or content) engine 110 that includes an ad (or content) creation processor 150 and an ad (or content) analysis processor 180. It is understood that while the preferred embodiment is described in the context of advertisements, that a variety of content other than advertisements can be implemented using the present invention, irrespective of the present invention having particular applicability to and advantages in working with advertisements. As such, the description in the preferred embodiment to the creation and analysis of personalized advertisements should not be viewed as limiting the applicability of the present invention to other types of content.

In different embodiment, as described hereinafter, the ad engine 110 may include one, the other or both of the ad creation processor 150 and the ad analysis processor 180. The ad engine 110 receives various inputs (from different communications channels, which may be unidirectional or bidirectional) that are shown as ad content input 120, user analysis input 130 and other input 140, each of which will be further described hereinafter The ad creation processor 150 generates, preferably in real-time when a particular user is identified as being in a position to receive a personalized ad, a personalized ad that is specifically formatted with content and presentation elements for that user, to varying degrees, as described hereinafter. This personalized advertisement is shown in dotted line as ad 300 in FIG. 1, and is further described in FIG. 2, described hereinafter.

The ad 300 is then delivered to the user, potentially with further adaptation depending on the display format. This potential further adaptation is illustrated by the platform specific content interface 192, which can be implemented in many different ways, using conventional technology, depending upon the application, to allow expansion or truncation of content depending upon the interplay between the content within the ad 300 and the characteristics of the display device.

Regarding usage in different ways, in certain circumstances the end-user display device 194 will display content in the same form as the ad 300 is created, which will correspond to a particular media platform, and as such the interface 192 is not needed. For the various different media platforms described and mentioned further herein, it is apparent that content can be created for usage in a particular display format for any media platform. In other circumstances, the amount of content may be too large for the particular display device, and as such the platform specific content interface, in conjunction with metadata, content tags and/or other relational indicators associated the content in ad 300, will determine whether to reduce the amount of content and which content to keep and which to discard in order to display a recognizable ad on the different sized display.

The end-user display device 194 can take many different forms, and the platform specific content interface can work with various different media platforms, including but not limited to an internet ad media platform, a set top box media platform, an outdoor electronic media platform, a print media platform (including catalog sales, newsletters, newspapers and magazines) as well as traditional television, live media, video on demand (including video displayed on airlines), audio programming, RSS or other feeds, and other forms of communication, as will become apparent below. Further, for the same platforms, there can exist display devices 194 of different sizes—from cell phone screens, to IPOD screens, to flat-TV displays, to outdoor billboards as well as capabilities—from audio only, to visual only, to various audio-visual combinations. As such, the content of an advertisement may need to change depending upon the display device, and the interface 192 can be used to accommodate these differences.

While there are differences in the type of advertisements and the manner in which they are changed, the above platforms can each use the dynamic ad creation process according to the present invention to make advertisements associated with each media form more effective. With all of the platforms, a statistical tracking mechanism is preferably implemented, as shown by the ad analysis processor 180, whether it be online (based upon "clicks" of a mouse indicating click-through to a specific internet page or a sale, or cookie information, as well as statistical information from other feedback mechanisms, such as statistical information obtained from an integrated remote control with a set-top box or an offline call, text message or other form of communication not in direct bi-directional communication with the display 194 and associated interface 192 that is causing the display of the ad 300, preferably in combination with the detailed user analysis information previously obtained. The detailed description of the preferred embodiment being provided hereafter is with reference to an Internet ad media platform. Differences in implementation with respect to the other media platforms will then be discussed further herein.

In a particular implementation, since websites still require ad tags to run properly, the platform specific content interface can include static tags to users by interfacing with an ad server (not shown). Ad tags are the specific pieces of information needed to implement an personalized advertisement into a web page in a dynamic process; for example, so that the advertisement can change based on the content within the web page, even though the web page may not call a different script, or "tag".

Figure 2:
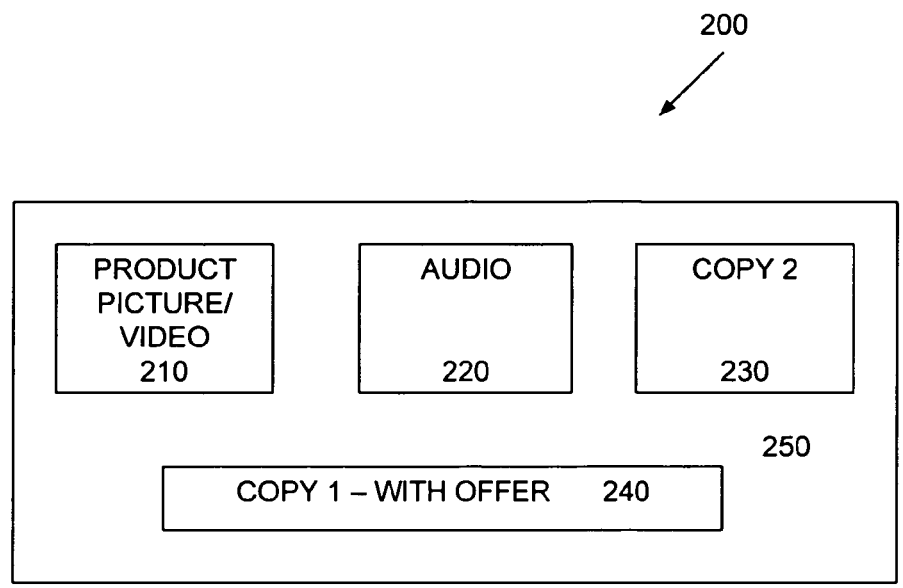
FIG. 2 illustrates a preferred embodiment of a template for an ad page within an online ad page sequence according to a preferred embodiment of the present invention.

FIG. 2 illustrates an exemplary version of an ad template 200 that can used to create a personalized ad. The terms personalized ad and ad are used interchangeably herein to refer to a combination of different display elements that are combined in order to provide a cohesive display used to influence a user. The exemplary template shown includes a product picture/video element 210, and audio element 220, copy elements 230 and 240, one of which will typically include the offer for the product as characterized, as well as the template element information 250, which includes information on the background, relationship of the various other portions to the background, size of the display, and the like.

Each personalized advertisement is formed from display elements that are placed into a template as described. Various combinations are used for multivariable split-testing to occur. The template 200 as illustrated in FIG. 2 provides various display elements as described above can be switched in and out during this process, as described below.

Figure 3:
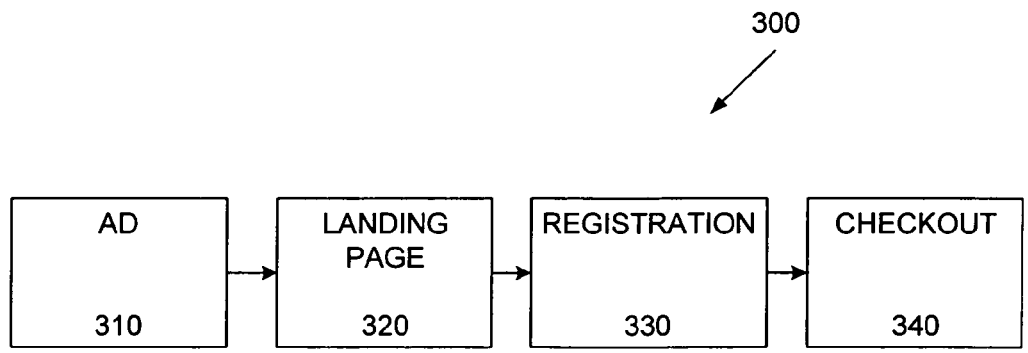
FIG. 3 illustrates a preferred embodiment of an online ad page sequence according to a preferred embodiment of the present invention.

FIG. 3 illustrates an exemplary sequence 300 of an Internet ad. While described as a personalized ad, in order for a user to complete a purchase of an internet based item for which an ad has been displayed, as shown in FIG. 3, the following sequence 300 will typically occur: an Ad 300, with the elements as illustrated and described in FIG. 2 previously. Thereafter, a landing page 320, registration page 330 and shopping Cart/Checkout process page 340 can occur, each of which can be template based and personalized as described herein.

For an embodiment in which a Standard Internet Offer Process is implemented, standard Internet offer process terminology should be understood. An Internet offers consist of similar elements, as described with respect to FIG. 3. The advertisement step 310 is the initial contact a user has with a product or service. The ad can take the form of any of the below:

A clickable image on a website
A popup window with image, animated or interactive content;
Paid text links
Paid search result listings
Email There are many other types of advertising available online other than these as well.

The landing page 320 is the initial HTML page that the user "lands on" by clicking on the ad. A landing page 320 typically provides more in-depth information about the product or service being offered. This could include product details, testimonials, and pricing information.

The registration page 330 is usually a secondary HTML page, but can be implemented as part of the landing page. It is a form where the user enters initial, non-secure information to begin the purchase process. The information entered usually is email address, zip code and birth date. If a product or service does not require payment, this page is usually the last step in the process.

The checkout page 340 is the final process page where the user must enter their payment information in a secure HTML form.

Figure 4:
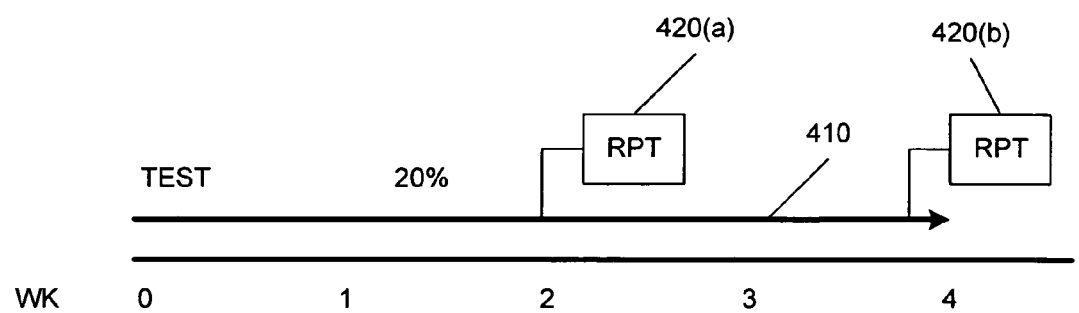
FIG. 4 illustrates an ad campaign according to the present invention.

FIG. 4 illustrates an overview of the implementation of the present invention in the context of a conventional ad campaign. As illustrated, this campaign takes place over a four week period of time, in which during week 1 testing of various ads is performed on identified users to determine responsive to various ad combinations, and in week 2 a significant amount of ads are distributed to a larger group of identified users in order to attempt to achieve the overall goals of the ad campaign (shown as 20% for illustrative purposes).

A significant aspect of the present invention, in contrast to the manner in which conventional ad campaigns are performed is indicated by the continued testing feature, shown as arrow 410. This continued testing feature 410 continues to test various ad combinations throughout the entire ad campaign, with an emphasis placed on testing new ads that are rendered as a result of identifying unpredictable high-profile events that occur during the course of the ad campaign and which cause, by their very nature, the mindset of a statistically significant group to change. Such unpredictable events are, for instance, the 9-11 terrorist bombings, a devastating hurricane, a tsunami, the specific winner of a world series or particular gaming event, or the election of a particular official, all of which can influence the purchasing patterns of end-users.

Another aspect illustrated by FIG. 4 is the inclusion of reports 420, two of which are shown as 420(*a*) and 420(*b*). The client that institutes the ad campaign is preferably provided these reports, typically from the advertising company running the ad campaign, to illustrate the success of the campaign, thereby allowing for the results of the campaign to be used by the client to determine what types of ads to run in other advertising media platforms, and also for the content of the ad campaign to be used in such other advertising media platforms. Identifying the content, statistical feedback and particular attribute data used (and thus not used) in each different campaign with a campaign ID can also allow for correlations to be found that otherwise might not be found.

Figure 5:
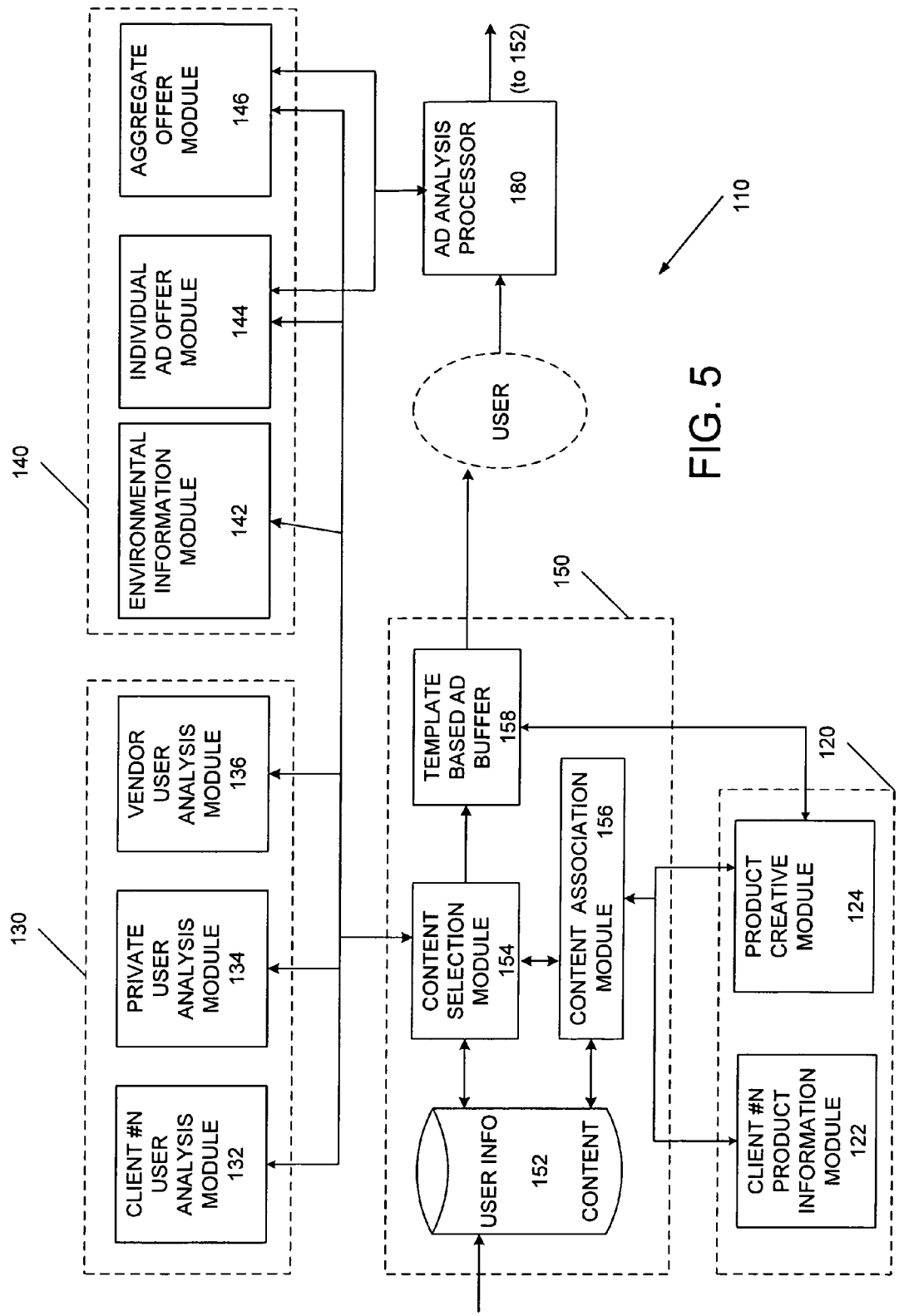
FIG. 5 illustrates a functional block diagram of the ad engine according to a preferred embodiment of the present invention.

FIG. 5 illustrates a functional block diagram of the ad engine 110 according to a preferred embodiment of the present invention. The ad engine is preferably implemented using a computer system and associated software, though aspects of the invention can be implemented solely in software or hardware.

The computer system can take various forms, but typically will be a server of some type that contains a microprocessor, memory and various hardware interfaces as are known. The software that performs the functions described herein can be written in numerous languages, including high speed languages such as C++, and other languages such as Java, .NET, PHP, Delphi, and others. The inventive aspects of the present invention as described herein are not associated with the specific hardware implementation. As such, no further discussion of a specific hardware implementation is needed.

The software that works with the ad engine 110 is described more fully hereinafter, both in functional descriptions as provided with respect to FIG. 5, as well as the flow-charts set forth in FIGS. 6, 7, 9 and 10, in combination with the Table in FIG. 8 all of which are described further herein. It is noted that the software for the ad engine 110 can be resident on a server which provides the functionality described herein, or can be integrated with servers that provide other functionalities, such as email, hardware analysis and communication across cable TV networks, broadband Internet, and telephony applications. The software can be independent or developed and integrated with a particular delivery mechanism, such as an Internet ad server.

Associated with the software for the ad engine 110 is database 152, which while shown as being within the ad creation processor 150 and in communication with the ad analysis processor 180, can store information contained therein in many different manners, including storing information in a distributed, redundant, object oriented, relational or other manner.

Before providing further detailed description of the ad engine 110 and related functional components, the ad engine 110 can be described as providing for dynamic ad creation and analysis. An aspect of this dynamic ad creation is the ability to perform real-time split testing of the response experience by the end-user customer to whom the ad is delivered. This real-time split testing provides a predictable and improved level of response among consumers, as well as providing a consistent user experience throughout the process of an advertised offer, and can thus improve advertising response rates online based upon the technology and real-time optimizations described herein.

The technology consists of different modules that complement each other and provide various information for the ad engine 110 and allows for the ad creation processor 150 to create, preferably on the fly, advertisements specifically for a particular user or group of users, as described more fully below, and the ad analysis processor 180 to monitor the effectiveness of the ads based on predetermined criteria and provide statistical information that can be associated with the specific aspects obtained about the users during user analysis. These different modules that work with the ad engine 110 include an ad content input module 120 that preferably includes a client product information module 122 and a product creative module 124 that provide display elements used in creating a personalized ad. A user analysis input module 130 is also included that preferably includes client user analysis module 132, a private user analysis module 134, and a vendor user analysis module 136, each of which provide user attribute data. Also, an other input module provide various different attribute data, with attribute data specifically shown as being obtained from a constant, environmental import module 142, an individual ad module 144 and an aggregate other module 146. These modules will be further described hereinafter.

The ad content input module 120, as noted above, preferably includes a client product information module 122 and a product creative module 124.

The client product information module 122 contains information on the products of the ad campaign, which products can each have numerous characteristics. Thus, for example, for an ad campaign for vehicles for a particular company, the various brand models, styles (such as sedan, SUV, station wagon, convertible, sports car, van . . . ) colors, engine sizes, pictures and/or video of product or scenes with product, accessories are typically provided, text and other slogans (such as trademarks and product information).

In the personalized ad, there will exist display elements that together create the advertisement. A display element can be a particular audio or visual element that the user can perceive. Associated with each display element is typically a plurality of display element types. Thus, for example, a picture of a particular 4WD V-6 model blue Volvo sedan can be a display element, and associated with that display element is type information used by the ad engine 100. Display element types for this example could be, for example, the car color type (blue), car type (sedan), brand type (Volvo), drive type (4wd) and engine type (V-6). In order for the system to select the appropriate photo, there thus needs to be a match of the type information associated with the display element. The system will preferably match type information that is associated with the display element with a range of attribute data corresponding to a particular attribute, in order for content of the display element to conform to the appropriate context (thus answering as best as possible the who, what, when, where, why and how aspects that provide context to content) as indicated in the attribute data associated with the attribute.

Certain display elements are necessarily associated with combinations of type information from other display elements. For example, the offer price of the above referred to vehicle will change depending on the various type information. Accordingly, the offer display element will changed based on a combination of that type information (as well as potentially other type information).

The product creative module 124 contains creative content associated with the ad campaign. This can include the color of the template used to create the personalized ad, fonts and colors of fonts, template style for the ad and the like, each of which are also referred to as advertising elements likewise have type information associated therewith. Whereas the client product information is typically provided by the client that requests an ad campaign, the information within the product creative module is typically provided for by the advertising company running the campaign.

The display elements from the client product information module 122 and the product creative module 124 are supplied to the content association module 156 that is within the ad creation engine 150. As described hereinafter, the content association module 156 associates specific attribute data (typically a range of data) to match with the type information of advertising elements. This allows for creation of the content of the personalized ad, as described hereinafter, which has the appropriate context for the particular individual. Thus, for example if a particular user is a 27 year old single female living in zip code 60606, who currently drives a 1996 GM sedan and makes $32,000 per year also likes the color green, the present invention can provide different levels of sophisticated advertising depending upon the requirements of the campaign. Thus, for a GM ad campaign directed to selling vehicles, one level of advertisement can serve an ad that provides a basic offer on the basis of this person's age, gender and income level, whereas a further refined ad can take into account that she already has a beige sedan and likes the color green, and use these further attributes to further personalize the ad by showing, for instance, a green GM car (sedan or otherwise depending upon the outcome of the decisions rules) or a picture of that GM car with a person wearing a green sweater. Still other ads can be created depending upon different levels of refinement, whether that be 3, 4 or 50 or more different pieces of relevant information used by the rules to ascertain what content to deliver to a particular user.

Whereas the term "type" was used above as associated with the display elements, the term "attribute" is used to associate with the information used in the content selection process. Thus, a real time attribute could be time of day, with the attribute data associated therewith being the actual time of day. Therefore, when a rule requires using the time of day attribute, the attribute data of the time of day is used in processing that rule.

The various attribute data associated is also preferably stored in database 152. Thus, attribute data stored includes information from the user analysis inputs 130 and other inputs 140 illustrated in FIG. 1, with subcomponent modules identified further in FIG. 5. Subcomponents of the user analysis inputs 130 include the client user analysis module 132, the private user analysis module 134, and the vendor user analysis module 136, each of which are described further hereinafter. Subcomponents of the other inputs 140 include the environmental information module 142, the individual ad offer module 144 and the aggregate module 146, each of which are also described further hereinafter.

In terms of functional modules, the last to be identified before detailing the further modules and operation mentioned above, is the content selection module 154 and the template based ad buffer. The content selection module contains, in one specific embodiment, rules that associate attribute data to display element types, though as described hereinafter other relational implementations can be used. Based upon the rule, the attribute data from the user analysis inputs 130 and other inputs 140 is used to determine which display elements are necessary to create an individual ad, and then appropriately places each display element within the selected template 200 that is used to create the personalized ad.

A description of the various attributes, and associated attribute data, will now be provided in the context of the various different user analysis and other inputs. It is noted, however, that there can exist different types of attributes, including but not limited to the current state environmental attributes, current event environmental attributes, user state attributes and user personal attributes discussed herein. It is preferable that all attribute data be time-stamped, and that user attribute data be identified with a user ID, so that it can be tracked and used most appropriately, particularly in cross-channel applications, such as with an Internet platform and interactive television platform or a print platform, since passing of user ID's between different channels allows greater correlation of information that has previously not been capable of being correlated.

Constant environmental information import module 120 inputs environmental information of current events, situations and patterns (information associated with each of these being identifiable as an attribute and having attribute data associated therewith), and then filters the information to obtain attribute data for the corresponding attribute needed by the ad creation processor 150. The input environmental information includes news events, weather patterns, traffic patterns, time of day and other information external to the user's current Internet experience.

Such information, referred to as "environmental" information herein in order to highlight the changing aspect of the information content to it, parsed from external sources and used (along with other input information as described herein) to determine the appropriate display elements needed to create the personalized advertisement which to send to the end user. Weather and time of day changes, which is easily apparent. News changes on a daily basis, and, depending on the news, that can cause a change in the optimizations as described herein. The other environmental information can also be used to optimize which add to produce and then distribute to a particular person or group of people. The environment information can be obtained in a number of manners, both offline and online. Examples of informational feeds that can be used to obtain this information are RSS and XML-.RSS.

Really Simple Syndication (RSS) is the most commonly used protocol for distributing information. The latest RSS specification can be found at http://www.rss-specifications.com/. From the RSS form of the input, environmental data is selected and formatted as attribute data so that it can be understood by the ad creation processor 150 according to rules that are set within the content selection module 154, as described further herein.

While the RSS format provides for the greatest amount of information possible, the selection process requires understanding the form of the data, which will include setting up logic to watch for data having certain characteristics, and then once located, parsing the data in order to place selected data in an attribute data format understood by the ad creation processor 150 as described above. A large amount of information can be created and/or provided in an attribute data format already understood by the ad creation processor 150. For such purposes, an XML format interface can "pull" desired and interpret such data in real time. For example, the news source creates a custom XML script that is called every hour to load this attribute data information. The news source ensures the script gets updates as events occur. An example of a $3^{rd}$ party news source is http://www.moreover.com/ An API specification of built-in XML formats provided to partner feed organizations to assist in their development process.

User analysis input 130 obtains information currently known about the user, and filters and formats the information into attribute data so that it can be used by ad creation processor 150. This information can include, for example, demographic and/or geographic data brought in by registration or co-registration sources; cookie information, or information obtained from interfacing with a partner analysis engine. This information can also include information obtained from interactive dialogue between the user and the client and/or vendor—since while the present invention has as a specific advantage the ability to provide a personalized advertisement without requiring the user to directly provide input, it is recognized that if the user does provide input in some manner, such input should be tracked and effectively used, with an example being that if a user requests a price quote for a specific type, brand and color of car, this information can be used in the present invention to thereafter target advertisements using this now known information.

Explicitly shown in FIG. 5 are three different types of partner analysis engines/modules: the client user analysis module 132, the private user analysis module 134, and the vendor user analysis module 136. Each of these engines will typically provide information that the other does not and in certain instances cannot (due to privacy regulations) have, although certain engines/modules can provide attribute data that may be similar though collected from different sources and, as such, being capable of further verification. Thus, for example, the client that wants its cars sold will provide information on users that it has collected from its own client user analysis module 132. This user analysis information will typically be available to an entity that creates an ad campaign, though of course it is understood that the ad creation engine 150 can operate with user analysis information from only a single source. Private user analysis engines/modules are available, such as Experian for a fee, and can be programmed to provide available attribute data, both public and private, associated with a particular user. Similarly, the vendor that distributes content (which can be the same or different than the advertising agency). It is understood that data is therefore accumulated using these different sources for all the different users, which different users can number in the tens to hundreds of thousands and more.

This user analysis information is gathered in a number of different ways, and is preferably stored as user information in database 152 for usage by the content selection module 154 of the ad creation processor 150. In addition to analysis engines, user attribute data can be obtained in other ways, such as by registration and other information specifically provided by the user during various points of contact with the advertiser, publisher, third party, or the system described herein.

The content selection module 154 can also use information that is not specific to a particular user, but related to an aspect of the user—such as a demographic of age and gender. Such information can also be generated from contact with the user, such as IP address, bandwidth and other elements related to their connection to the advertisement delivery system. It can further include aggregate information generated during a user's use of a publisher's system, or past usage or purchasing information stored in the system described herein.

A significant aspect of the user analysis information is personal demographic data. Standard personal demographic data can include, but is not limited to, the following information about a user:

Age
Gender
Zip code
Household income
Profession or Education

Other information that is imported into the ad creation processor 150 can be used, as described further hereinafter, to create a detailed relational analysis of a user to a particular ad campaign. Demographic data can be imported in real-time (as described above with respect to environmental information module 142) or not in real-time (such as being input through a user analysis input 130 or at a partner website). Preferably, the user information is referenced with some type of identifier such as a unique ID or using another accepted protocol to ensure that no personal informational is compromised during the transfer of data from any source into the ad creation system 100.

Individual add offer module 144 stores attribute data obtained from rules optimizations performed on the various content combinations as a result of statistical data being obtained by ad analysis processor 180 as described further herein.

Module 144 stores the results from many different combinations. In particular, the responsiveness of a particular variable combination cannot be judged accurately until a certain amount of views have taken place—effectively called a sample size. Usually Internet ad sample sizes range from 2,000 to 10,000 impressions (user view) per combination. Assuming a 2,000 impression sample size and three possible states for each of four variables (background color, copy, product image and weather icon), rules optimization would preferably have 72,000 impressions to determine the best combinations of display elements to use for the relevant user group—but based upon the detailed knowledge the system has from the user analysis. Once this overall rules optimization is determined, the a baseline fixed offer can be determined, with further other offers being determined based upon further optimizations (that include additional rules and can include different display elements associated therewith) based upon specific further detailed analysis of the specifics that are relevant to subsets of the group—but again based upon the detailed knowledge the system has of each of the user's from the user analysis. Thus, for example, if the group of users were female between the ages of 25 and 34 for the baseline fixed offer that is obtained, further rules optimizations may further occur based upon the specific age of each individual, and further based upon a another variable within each age group. As described hereinafter, the statistical feedback obtained for each of the further detailed levels of rules optimizations can then be used to assist in determining how to proceed in creating further other offers both with that ad campaign and across other ad campaigns. When implemented on a large scale (note that over 10's of millions of individuals will view a particular sitcom within an hour, and each can potentially be tracked), a particular ad campaign can be very fine tuned with many different combinations of display elements for individuals of many different characteristics. As such, rather than having a small number of fixed baseline offers, there may also be included many different templates, each having a set of different display element combinations, which can each be suited for a particular individual.

It should be also noted that there can be included within the rules the logic needed to avoid the same personalized ad from repetitively being provided to the same person, as well as selects variants of the personalized ad for the same person.

Aggregate offer module 146 combines the results of the ad analysis processor 180 from different ad campaigns in order to determine patterns that would otherwise not be found. Thus, for example, ad campaigns from GM, Nordstrom and Borders may indicate that a particular 27 year old female living in zipcode 60606 and making $32,000 per year will buy the shoes advertised when the advertisement is displayed between the hours of 10 am and noon after having received a paycheck on the $15^{th}$ of the month, by combining the purchasing patterns of that individual based on a number of different ad campaigns.

Further detailed rules optimizations are associated with the individual ad offer module 144 and provides for rules optimization to occur based on predetermined criteria, such as click through rate, once baseline fixed optimization has occurred, as mentioned above. The optimizations that can occur with the individual ad offer module 144 can include optimizations associated with revenue/profit statistics, essentially real time calculations based on past and current revenue and profit of the personalized advertisements on the system 100.

The operational sequence will now be described with respect to various figures.

Figure 6:
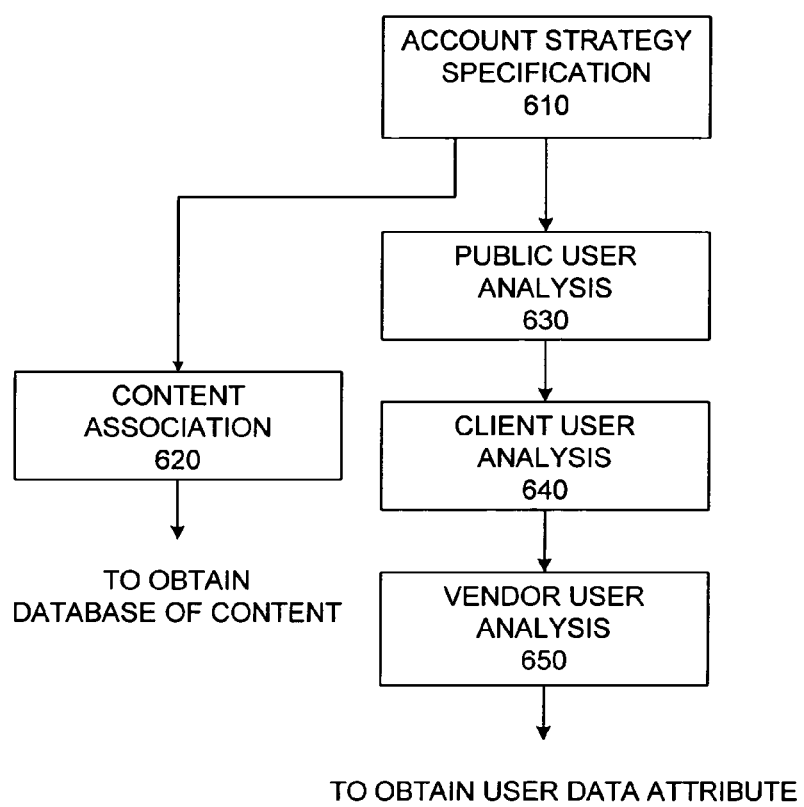
FIG. 6 illustrates a flowchart of the system set-up according to a preferred embodiment of the present invention.

As shown in FIG. 6, in step 610 an account strategy specification is first obtained. This specification will describe the product and the approach of the ad campaign. Based on that, step 620 occurs using the content association module 156, which allows an administrator to input the various display elements and associate information types with each display element to obtain the database of content as described previously.

Similarly, in steps 630, 640 and 650, the public, user and vendor analysis engines are used, respectively, to continually update a database of names and associated user characteristics, such as gender, zipcode, age, IP address, email address, income, subscriptions (such as WSJ or Disney) and other information that may be available, in order to obtain the attribute data for the desired attribute types. The information in different engines 630, 640 and 650 is intended to be for the most part distinct, since it is obtained from different sources and may be subject to privacy regulations, as described above, though some of it may be redundant. With this, attribute data associated with a many different users that will be targets in the ad campaign is obtained and stored as user information in database 152.

At this same time, rules that are used in order to fill the various display elements in the template 200 are determined. These rules will preferably have a number of aspects to them. Certain rules are individualized to include a basic level of information regarding a particular user when selecting display elements for an ad. Other rules use more sophisticated information obtained from user analysis and other sources when selecting display elements for an ad. Rules can include mappings, logic tree structures, logic rules, rules that include weightings (including adaptive weights based on feedback statistics) or other implementations, in order to give emphasis to certain attribute data and de-emphasize other attribute data. Rules can even exist which will create new rules automatically. The implementation of software and/or hardware that can implement the functionalities of the rules as described herein is known in the art, and as such usage of the word "rules" in the context of this invention is not intended to be limited to a particular technical manner of implementing them.

For example, certain display elements, as a result of the specific logic, mappings and/or weights of the rules, but not others, could be referenced when obtaining a baseline fixed offer, and these display elements may be based only on zipcode, gender, and income relative to zipcode. It is understood that depending on the ad campaign there may be different aspects to what constitutes a baseline fixed offer, and that in different campaigns differing amounts of analysis may be needed to created the baseline fixed offers and the more sophisticated offers. Other display elements, as a result of further specific logic, mappings and/or weights of the rules, but not others, could be referenced based upon those analysis variables used, such as certain analysis variables of the kind identified in the Table of FIG. 8 (where, for example, for each identified attribute kind, there can be different attributes, for instance "foreign languages" could include a language spoken attribute, as well as a language read attribute, with English, Spanish, German, Mandarin . . . being different attribute data for both of these attributes, and "personal events" could be a date of birth, anniversary, religious holiday(s) practiced, favorite type of food or beverage, or sporting team, as examples only. Various levels of sophistication may be implemented, depending upon with the rules in the content selection module 154 take into account more or less different analysis variables.

With respect to the implementation of the rules, in a preferred embodiment the rules take into account a set of different attribute types (certain of those described in the Table of FIG. 8 or others, for example). While any given rule or set of rules that implement a selection process of particular display elements will include different attributes that therefore create a set of attributes, it is helpful to distinguish different kinds of attributes, in order to ensure that for a given selection process, a variety of different kinds of attributes are included. As such, different kinds of attributes are:

current state environmental attributes, such as time-of-day, time-of year, and weather (which as an attribute is typically dependent upon a user state attribute of location, as the weather differs in various locations);

current event environmental attributes, which, as noted herein, are unpredictable, for the reasons as described;

a user state attribute, such as whether the user is online, whether the user is watching television, what the current online site the user it at, the current sporting event the user is attending, the current online article the user is looking at, the personal location the user is at (home, office, hotel, city/street), obtained, for example from any on of numerous sources such as, for instance, cookies, IP address or GPS determined location. Combining two of the user state attributes together when making rules determinations is particularly effective;

a user personal attribute, such as age, gender, income, residence address, marital status, individual preference (such as color, food, beverages, brand of car, type of car . . . ).

While other classifications of attributes are entirely within the scope of the present invention, the advantageous features of the present invention are captured with respect to these representative attribute sets. It is also understood that it is preferable to link these attribute sets and attributes are display elements and their corresponding display element types.

In a preferred embodiment, the present invention takes into account combinations of different attribute kinds when initially creating rules. It is noted that the term rules as used herein should broadly be construed in order to accommodate various manners of implementing logic to use analysis input information from various sources, illustrated in FIG. 1 as user analysis input 130 and other input 140, to aid in determining the display elements that should be used.

Different combination of attributes can be used to select a different set of display elements, with the specific attribute data associated with the attributes being used to then determine which display element among a set of related display elements to select. Thus, for example, the set of display elements may be pictures of cars for a specific ad campaign, with certain of the pictures being associated with males over 30 years old who make more than $20,000, whereas other ones of the pictures may be associated with females over 20 who make more than $25,000, have a college education, and also are married. And, within the pictures presented to this group of females, certain may be directed such females who also like the color yellow, whereas other pictures may be directed to females who like the color black.

It is apparent that the other attributes and their associated attribute data can be used to create different sets of associated display elements. For instance, with an environmental attribute on weather, if the day is sunny then certain display elements are selected, whereas if it is cloudy or rainy, other display elements are selected.

Rules can also have priorities between them. Thus, for example, A first set of rules can be used to select a first display element for an advertising campaign for most instances, but, if it is determined that there is a current event attribute that is triggered, then a second set of rules can be used for a period of time after that current event to select that first display element.

It is noted that since the personalized ad that is delivered to the end user has taken into account personalized data, that each ad is personalized to that user. It should be understood that a given ad may be identical to an ad sent to another person, as the two individuals have aspects that overlap, and cause them to be grouped similarly. But while two individuals may be similar in many characteristics, there are always characteristics that differ, and the present invention includes the ability to differentiate these differences and, if needed, present an ad that is personalized to a particular individual and only that individual.

Rules optimization, already discussed above, can occur by analyzing many different factors to obtain relational patterns that can be used to update the logic, weights and/or mappings that are used with the rules, between user analysis information and display elements, for example like sequences of events. Statistically obtained feedback information and user analysis date is preferably aggregated, preferably over some periodic interval, such as nightly, into patterns that can then be interpreted by requests for future offers. By following trends in patterns, the system creates a level of expectation based on previous experience. Like sequences of events can be applied to the various attribute types noted above, which therefore include, but are not limited to:

User demographic patterns

User geographical patterns

Offer types (product analysis and comparison)

Environmental factors and sources (current events, time of day, weather, holidays, day of week)

Bounty and revenue generated by the action of the offer, based upon many different criteria, including advertisement view, click or product purchase.

Figure 7:
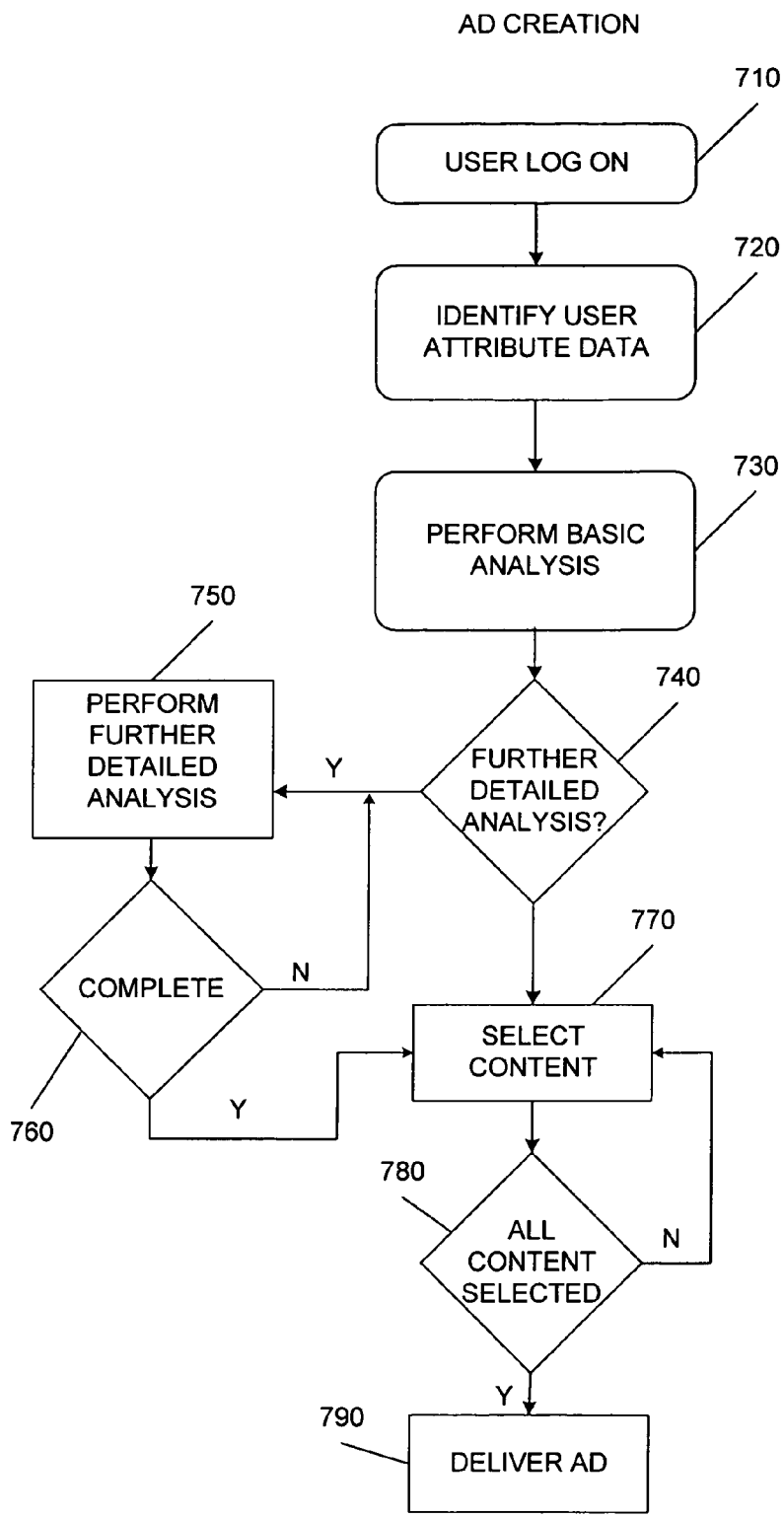
FIG. 7 illustrates a flowchart of the system ad-creation according to a preferred embodiment of the present invention.
Figure 9:
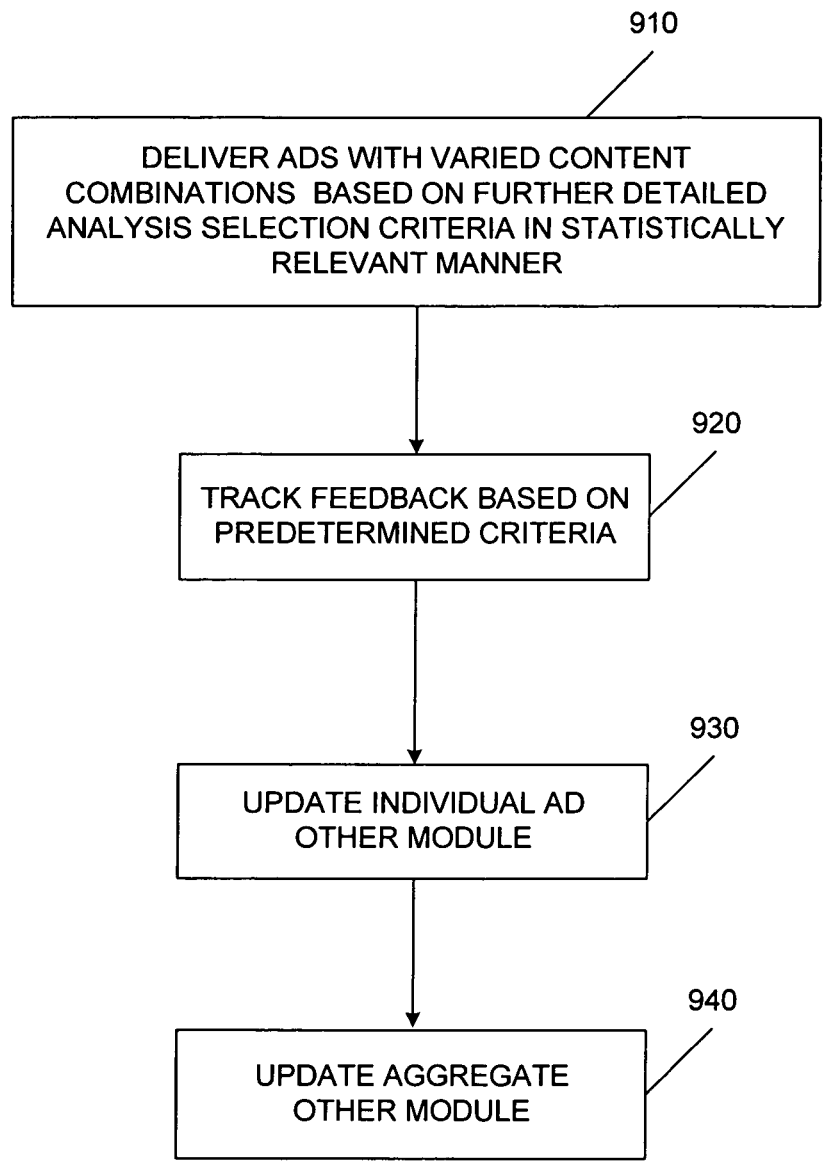
FIG. 9 illustrates a flowchart of the system split test analysis and continued split test analysis according to a preferred embodiment of the present invention.

With rules initially established (it is understood that a benefit of the present invention is that these rules can change during the period of an ad campaign), ad creation can occur when a user then is detected as signing on to the Internet, shown as step 710 in FIG. 7. Since a user's online visit can extend for a period of time, it is understood that detection of a user to a particular website (particularly one requiring a login such as the Wall Street Journal), can occur multiple times within a single online visit. At the time of detection, that user's attribute data is then called by the content selection module 154 in step 720, in combination with other attribute data sets as described herein, and used in step 730 for the basic baseline analysis, which, for example, could be various combinations, including, for example age and gender, or gender, zipcode and income relative to zipcode or age gender and zip, or. Step 740 identifies whether other attribute data are to be used in selecting content based upon further detailed analysis. If so, then step 750 is repeated for as many times as needed, as shown by the decision step 760. Selection of the content associated with the display element takes place in select content step 770. Content is selected for each different display element based upon decision step 780 determination until the template is filled, and then the ad is delivered in step 790. It is noted that the specific display elements selected will, for a baseline offer, typically require only the initial baseline analysis in step 730 without the further detailed analysis steps of step 750, and that the more sophisticated the detailed analysis step 750 becomes, the more complicated the rules between the user analysis information and the types of the display elements.

While an example of simple baseline rules has been provided, as well as examples of using additional further detailed analysis, the specific combinations of rules can vary widely, as will be appreciated.

The above describes selection of a single personalized ad. Attribute data, particularly that within the individual ad module will track the combinations going to the same or different users, in order to split testing to occur, which is further described with respect to FIG. 9. Ads are delivered with various content combinations based on the further detailed analysis selection criteria that change in a statistically relevant manner. This aspect of the invention is counterintuitive, since although there are a myriad of possible combinations, this step 910 typically requires making minimal changes to display elements for combinations that are related in order for observed changes obtained by statistics of the user reaction to the personalized ad to be statistically significant.

In step 920, the ad analysis processor 180 then tracks the success of an ad based on predetermined criteria as described previously, and then in steps 930 and 940 the results of this step 920 analysis are used to update modules 144 and 146, respectively. These updates based on the statistical information received by the ad analysis processor 180, in combination with the user analysis data (whether that user analysis data be derived from a user analysis input 130 or other input 140), can be used to verify the ad rules that are used to select the display elements, as well as to more accurately determine the specific content to provide to different individuals (i.e. update the mappings, logic and/or weights attributed to different attributes within the rules). It is further understood that this process of using the ad analysis processor 180 to subsequently then alter the mappings, logic and/or weights of the rules, or the rules themselves, in order for the ad creation engine 130 to provide ads that have display elements with the content more accurately selected will continue to occur over the time of the ad campaign.

The ad analysis processor 180 will also, as mentioned herein, correlate the feedback statistics with the user attribute data. This advantageously allows the creation of further statistical data that can be used in many different ways, such as to determine the effectiveness of an ad campaign, or parts of that ad campaign. Using this example, if the ad campaign has multiple media platforms being used, and it is determined that only one of them is being effective, the present invention allows for the cancellation of the ads to a particular media platform, or a particular group within a particular media, thus providing a cost savings to the client as a result of saving money on advertising that would have otherwise been ineffective.

Figure 10:
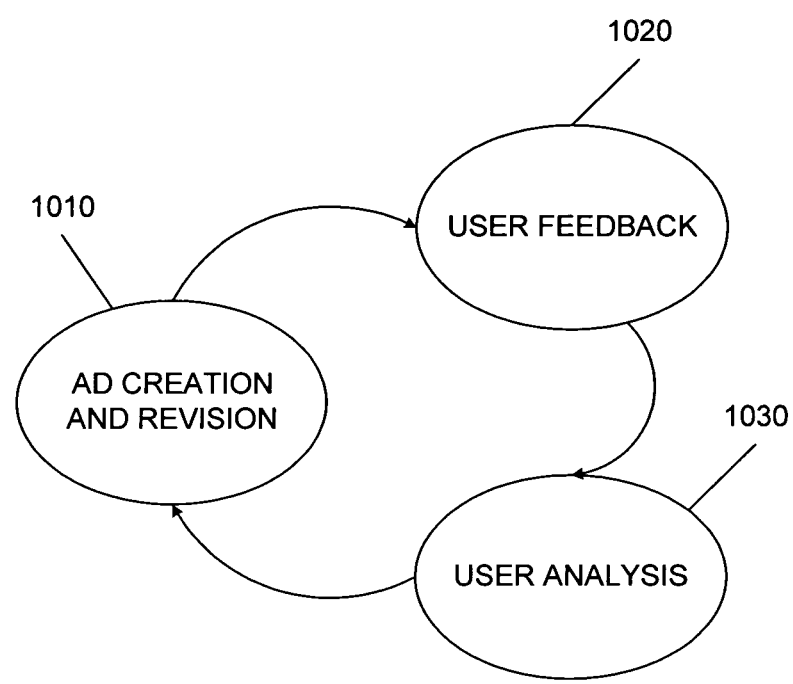
FIG. 10 illustrates a flowchart of the overall process that allows for improved personalized ads to be obtained according to a preferred embodiment of the present invention.

FIG. 10 illustrates the continuous improvement that exists with the present invention, with the ad creation step 1010 causing user feedback in step 1020, and that feedback being analyzed in step 1030 (both for an individual ad campaign as well as for aggregate different ad campaigns) in order to then provide additional attribute data that can be used to revise the rules that are used to create later personalized ads.

Figure 11:
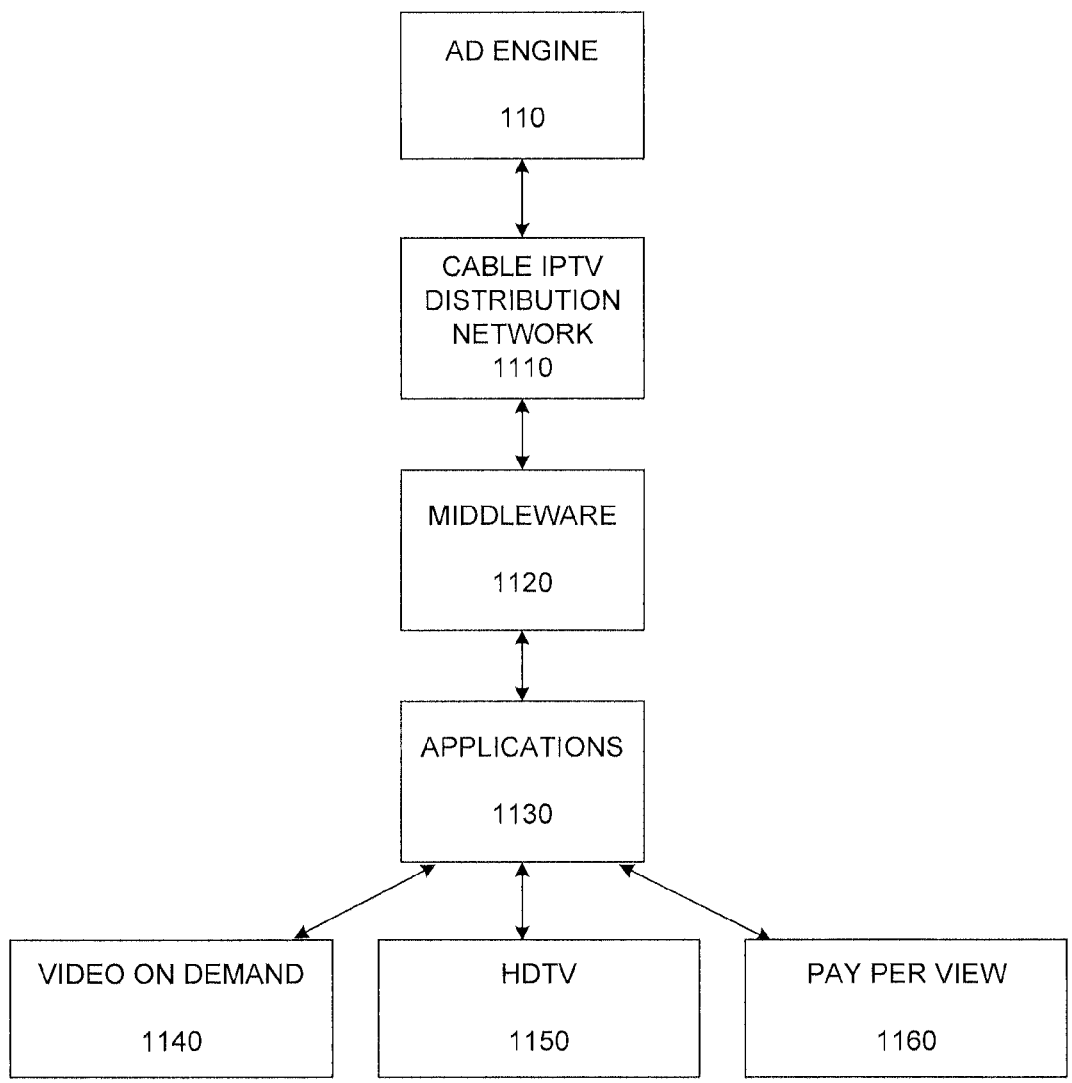
FIG. 11 illustrates an embodiment of the present invention implemented in a digital cable television system.

FIG. 11 illustrates an embodiment of the present invention implemented in a digital cable television system. In this embodiment, the ad engine 110 interfaces with a cable IPTV distribution network 1110, and its associated middleware 1120 and applications 1130, in order to provide personalized advertisements for video on demand 1140, hdtv 1150 and pay per view 1160. Feedback to the analysis processor 180 is provided within the network 110 itself.

Figure 12:
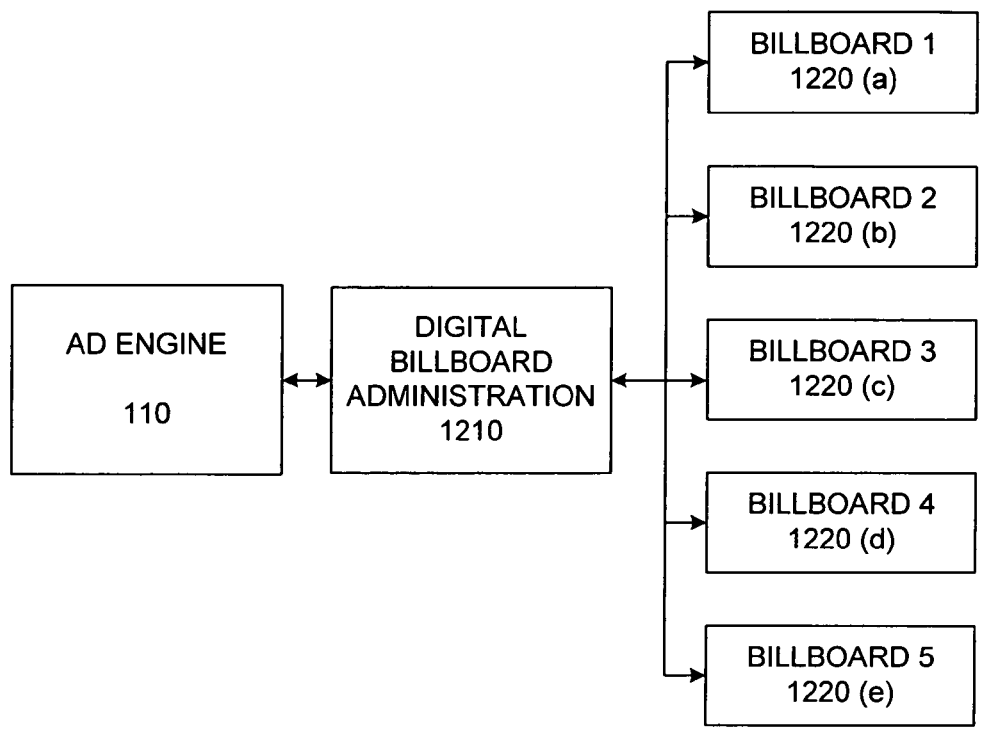
FIG. 12 illustrates an embodiment of the present invention implemented in an electronic billboard system

FIG. 12 illustrates an embodiment of the present invention implemented in an electronic billboard system. The digital billboard administration module 1210 interfaces with the ad engine 110 to provide personalized advertisements to various billboards shown as billboards 1120(*a*) to (*e*). Billboards can be personalized to the extent that the data used in determining a single advertisement can be collected from actual users who have or could view the billboard. For example, names of season ticket holders to a particular sports team are known, and can be used to personalize ads (even within a specific section of an arena), based upon their preferences. As another example, the in-flight entertainment screens can be viewed as billboards seen by passengers on a plane, whose names are known and can be used to optimize the in-flight content.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed:

1. A method of creating a plurality of personalized advertisements each for display to a different one of a plurality of users in real-time using a computer system comprising the steps of:

provided a plurality of display elements into a real-time selectable database, certain display elements being alternatively selectable, such that selection of one display element by the computer system prohibits selection of another display element; providing a plurality of advertising rules for usage with a rules engine associated with the computer system, the advertising rules associating environmental attributes, user state attributes and user personal attributes with different ones of the plurality of display elements, wherein:

a first advertising rule associates, using the computer system, a first combination of a user state attribute, a user personal attribute, and an environmental attribute to a first plurality of different display elements each intended for inclusion within a first location of a template; and a second advertising rule associates, using the computer system, a second combination of a user state attribute, a user personal attribute, and an environmental attribute to a second plurality of different display elements each intended for inclusion within a second location of the template that is different from the first location of the template; providing the template within the computer system, the template having the first and second locations that are each automatically tillable with one of the first plurality of different display elements and one of the second plurality of different display elements, respectively;

determining with the computer system, using attribute data associated with the user state attributes of a first of the plurality of users, the user personal attributes of a first of the plurality of users, and the environmental attributes of a first of the plurality of users, the plurality of advertising rules, and the rules engine, which one of the first and second plurality of different display elements to include within the respective first and second locations of the template to create a first personalized advertisement within the computer system for a first of the plurality of users;

forwarding the first personalized advertisement from the computer system for the display to the first of the plurality of users determining with the computer system, using attribute data associated with the user state attributes of a second of the plurality of users, the user personal attributes of a second of the plurality of users, and the environmental attributes of a second of the plurality of users, the plurality of advertising rules, and the rules engine, which one of the first and second plurality of different display elements to include within the respective first and second locations of the template to create a second personalized advertisement within the computer system for a second of the plurality of users, wherein the second personalized advertisement is different from the first personalized advertisement; and forwarding the second personalized advertisement from the computer system for the display to the second of the plurality of users.

2. The method according to claim 1 wherein the environmental attributes includes a current state environmental attribute and a current event environmental attribute associated with each of the plurality of users, the user state attributes include a location attribute and an online attribute and the user personal attributes include gender, residence by zip code and an income characteristic.

3. The method according to claim 2 wherein the current state environmental attribute includes one of time-of-day, time of year and weather.

4. The method according to claim 2 wherein the current event environmental attribute is used to create a rule that, depending on the attribute data associated therewith, will result in a selection of different rules in the step of providing the plurality of advertising rules.

5. The method according to claim 4 wherein the attribute data is obtained from a plurality of different sources, including a client that has purchased the personalized advertisement, a purchased source of data, and a publisher of the advertisement.

6. The method according to claim 5 wherein the display elements are obtained from a plurality of different sources, including a client that has purchased the personalized advertisement.

7. The method according to claim 1 wherein associated with each display element is a plurality of types, and the plurality of types are mapped to different ranges of attribute data.

8. The method according to claim 1 wherein the step of determining which one of the first and second plurality of different display elements to include within the respective first and second locations of the template is performed automatically when each of the plurality of users is online.

9. The method according to claim 8 wherein the environmental attributes includes a current state environmental attribute and a current event environmental attribute associated with each of the plurality of users, the user state attributes include a location attribute and an online attribute and the user personal attributes include gender, residence by zip code and an income characteristic.

10. The method according to claim 9 wherein the current state environmental attribute includes one of time-of-day, time of year and weather.

11. The method according to claim 9 wherein the current event environmental attribute is used to create a rule that, depending on the attribute data associated therewith, will result in a selection of different rules in the step of providing the plurality of advertising rules.

12. The method according to claim 8 wherein the attribute data is obtained from a plurality of different sources, including a client that has purchased the personalized advertisement, a purchased source of data, and a publisher of the advertisement.

13. The method according to claim 8 wherein the display elements are obtained from a plurality of different sources, including a client that has purchased the personalized advertisement.

14. The method according to claim 8 wherein associated with each display element is a plurality of types, and the plurality of types are mapped to different ranges of attribute data.

15. The method according to claim 1 wherein the step of forwarding forwards each of the plurality of the personalized advertisements to each of the plurality of users using the Internet.

16. The method according to claim 1 wherein the step of forwarding forwards at least one of the personalized advertisements to a personalized catalog adapted for receipt by one of the plurality of users.

17. The method according to claim 1 wherein the step of forwarding forwards at least one of the personalized advertisements to one of the plurality of users using an interactive television network.

18. The method according to claim 1 wherein certain of the display elements are pictures, and others of the display elements are text.

19. The method according to claim 18 wherein further ones of the display elements are one of audio segments and video segments.

20. A method of creating an ad campaign implemented over a period with a plurality of personalized advertisements for display to each of a plurality of identified users using a computer system comprising the steps of:

providing a plurality of display elements into a real-time selectable database, certain display elements being alternatively selectable, such that selection of one display element by the computer system prohibits selection of another display element; providing a plurality of advertising rules for usage with a rules engine associated with the computer system, the advertising rules associating environmental attributes, user state attributes and user personal attributes with different ones of the plurality of display elements determining with the computer system, using attribute data associated with the user state attributes, the user personal attributes, and the environmental attributes, the plurality of advertising rules, and the rules engine, personalized advertisements to send to each of the plurality of users, the personalized advertisements having certain display elements that are one of identical and similar, and other display elements that are different;

forwarding each of the personalized advertisements for the display to each of the plurality of identified users;

receiving at the computer system electronic feedback statistics from certain ones of the plurality of identified users in direct response to the respective different ones of the personalized advertisements provided by the step of forwarding, said feedback statistics including a plurality of statistics sets, each statistic set obtained in direct response to one of the personalized advertisements that had been forwarded; and analyzing with the computer system the feedback statistics to automatically update the plurality of advertising rules based on the feedback statistics; wherein the steps of forwarding, receiving and analyzing occur throughout the period of the ad campaign, so that the plurality of advertising rules used to determine the personalized advertisements to send are periodically updated by the computer system during the period.

21. The method according to claim 20 wherein the periodically updating takes place a plurality of times per day.

22. The method according to claim 21 wherein the periodically updating takes place throughout the period.

23. The method according to claim 20 wherein the periodically updating takes place throughout the period.

24. The method according to claim 20 wherein the periodically updating takes place after a determined current event, the determined current event being identified by environmental attribute data associated with one of the environmental attributes.

25. The method according to claim 20 wherein the step of forwarding forwards the personalized advertisement to the user using the Internet as a media platform.

26. The method according to claim 25 further including the step of using analyzed feedback statistics to alter another advertising campaign on another media platform than the Internet.

27. The method according to claim 26 wherein display elements determined as effective by the feedback statistics for the ad campaign using the Internet as the media platform are used by another advertising campaign on the another media platform.

28. The method according to claim 20 wherein the step of providing the plurality of advertising rules uses:
a first advertising rule associates a first combination of a user state attribute, a user personal attribute, and an environmental attribute to a first plurality of different display elements each intended for inclusion within a first location of a template; and
a second advertising rule associates a second combination of a user state attribute, a user personal attribute, and an environmental attribute to a second plurality of different display elements each intended for inclusion within a second location of a template.

29. The method according to claim 20, wherein the step of analyzing causes the update of the plurality of rules to occur in a manner that ensure that subsequent statistical feedback is statistically meaningful when compared the statistical feedback.

30. The method according to claim 29 wherein the update of the plurality of rules ensures that for a given set of rules that is used to create a personalized ad, that only one of the display elements is varied in a subsequently forwarded ad as compared to the originally forwarded ad during a split-testing period.

31. The method according to claim 20 wherein certain of the display elements are pictures, and others of the display elements are text.

32. The method according to claim 31 wherein further ones of the display elements are one of audio segments and video segments.

33. The method according to claim 20 wherein the feedback statistics of a particular user are used to update personal user attribute data for that particular user.

34. The method according to claim 33 wherein the updated personal user attribute data is used during a remainder of the ad campaign when determining subsequent personal advertisements to forward to that user.

35. The method according to claim 33 wherein the updated personal user attribute data is used during a subsequently initiated ad campaign for another product when determining personal advertisements to forward to that user in that subsequent ad campaign.

36. The method according to claim 35 wherein the subsequently initiated ad campaign has another period that overlaps with the period of the ad campaign.

37. The method according to claim 35 wherein statistical feedback is provided for both the ad campaign and the subsequently initiated ad campaign for a period of time, and is used concurrently to analyze both the ad campaign and the subsequently initiated ad campaign.

38. The method according to claim 28 wherein the step of determining determines as the personalized advertisements a set of personalized advertisements, such that each of the set of personalized advertisements differ by a predetermined number of display elements; and
wherein the step of analyzing determines a reduced set from the set of personalized advertisements to continue using based on the feedback statistics.

39. The method according to claim 38 wherein the periodically updating takes place a plurality of times per day.

40. The method according to claim 39, wherein the step of analyzing causes the update of the plurality of rules to occur in a manner that ensure that subsequent statistical feedback is statistically meaningful when compared the statistical feedback.

41. The method according to claim 1 further including:
determining with the computer system, using attribute data associated with the user state attributes of further ones of the plurality of users, the user personal attributes of further ones of the plurality of users, and the environmental attributes of further ones of the plurality of users, the plurality of advertising rules, and the rules engine, which one of the first and second plurality of different display elements to include within the respective first and second locations of the template to create further ones of the personalized advertisement within the computer system for each of the further ones of the plurality of users, wherein the further ones of the personalized advertisements have at least one further personalized advertisement that is different from the first and second personalized advertisements and at least another further personalized advertisement that is the same as one of the first and second personalized advertisements; and
forwarding the further ones of the personalized advertisements from the computer system for the display to the further ones of the plurality of users.

42. The method according to claim 38 wherein the step of determining provides different personalized advertisements to at least some of the plurality of users.

* * * * *